US010431951B2

(12) United States Patent
Tanaka

(10) Patent No.: US 10,431,951 B2
(45) Date of Patent: Oct. 1, 2019

(54) LEAKAGE LIGHT REMOVAL STRUCTURE AND FIBER LASER

(71) Applicant: FUJIKURA LTD., Tokyo (JP)

(72) Inventor: Hironori Tanaka, Sakura (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 15/225,181

(22) Filed: Aug. 1, 2016

(65) Prior Publication Data

US 2016/0336711 A1   Nov. 17, 2016

Related U.S. Application Data

(63) Continuation of application No. PCT/JP2015/052807, filed on Feb. 2, 2015.

(30) Foreign Application Priority Data

Feb. 3, 2014   (JP) ................................ 2014-018602

(51) Int. Cl.
*H01S 3/094* (2006.01)
*G02B 6/245* (2006.01)
(Continued)

(52) U.S. Cl.
CPC ........ *H01S 3/094007* (2013.01); *G02B 6/245* (2013.01); *G02B 6/264* (2013.01);
(Continued)

(58) Field of Classification Search
CPC ........... H01S 3/094007; H01S 3/06729; G02B 6/255; G02B 6/245
See application file for complete search history.

(56) References Cited

U.S. PATENT DOCUMENTS 5,926,600 A   7/1999  Pavlath
5,970,197 A   10/1999 Pavlath
(Continued)

FOREIGN PATENT DOCUMENTS

JP   63-214630 A   9/1988
JP   11-44823 A    2/1999
(Continued)

OTHER PUBLICATIONS

International Search Report dated Apr. 28, 2015, issued in counterpart International Application No. PCT/JP2015/052807 (2 pages).
(Continued)

*Primary Examiner* — Tod T Van Roy
(74) *Attorney, Agent, or Firm* — Westerman, Hattori, Daniels & Adrian, LLP

(57) ABSTRACT

A leakage light removal structure 70 is used to remove leakage light in an optical fiber 140 having a core 160, a cladding 162 having a refractive index lower than the core 160, and a covering material 164 having a refractive index higher than the cladding 162. The leakage light removal structure 70 has a fiber housing 72 that houses part of the optical fiber 140, a covering material extension portion 175 covering part of a whole circumference of the cladding 162 by extending part of the covering material 164 along a longitudinal direction of the optical fiber 140 within the fiber housing 72, and a cladding exposure portion 174 in which a portion of the whole circumference of the cladding 162 other than the covering material extension portion 175 is exposed within the fiber housing 72. The covering material 164 may be covered with a resin 76 having a refractive index not more than the refractive index of the covering material 164. For example, the covering material extension portion 175 is formed with a range of angles equal to or less than 180°

(Continued)

LIGHT PROPAGATION DIRECTION → about an axis of the optical fiber 140 in a cross-section perpendicular to the axis.

14 Claims, 6 Drawing Sheets

(51) Int. Cl.
*H01S 3/067* (2006.01)
*G02B 6/26* (2006.01)
*H01S 3/04* (2006.01)
*H01S 3/0941* (2006.01)
*G02B 6/255* (2006.01)
*G02B 6/42* (2006.01)
*G02B 6/14* (2006.01)

(52) U.S. Cl.
CPC ........ *H01S 3/0405* (2013.01); *H01S 3/06704* (2013.01); *H01S 3/06708* (2013.01); *H01S 3/06729* (2013.01); *H01S 3/0941* (2013.01); *G02B 6/14* (2013.01); *G02B 6/255* (2013.01); *G02B 6/2558* (2013.01); *G02B 6/4296* (2013.01); *H01S 3/09408* (2013.01); *H01S 3/094053* (2013.01)

(56) References Cited

U.S. PATENT DOCUMENTS

| | | | | |
|---|---|---|---|---|
| 5,995,697 | A * | 11/1999 | Byron | G02B 6/02104 385/123 |
| 6,317,547 | B1 | 11/2001 | Pavlath | |
| 2002/0186947 | A1 * | 12/2002 | Abe | G02B 6/02123 385/128 |
| 2007/0065083 | A1 * | 3/2007 | Singh | G02B 6/001 385/126 |
| 2013/0308661 | A1 | 11/2013 | Nishimura et al. | |

FOREIGN PATENT DOCUMENTS

| | | |
|---|---|---|
| JP | 2009-69492 A | 4/2009 |
| JP | 2009-116076 A | 5/2009 |
| JP | 2011-186399 A | 9/2011 |
| WO | 2007/148127 A2 | 12/2007 |
| WO | 2013/001734 A1 | 1/2013 |

OTHER PUBLICATIONS

Search Report dated Oct. 5, 2017, issued in counterpart European Application No. 15743598.3 (6 pages).

* cited by examiner

LEAKAGE LIGHT REMOVAL STRUCTURE AND FIBER LASER

TECHNICAL FIELD

The present invention relates to a leakage light removal structure, and more particularly to a leakage light removal structure for removing leakage light produced at a fusion splicing point of an optical fiber in a fiber laser or the like.

BACKGROUND ART

Generally, when optical fibers are to be connected to each other by fusion splicing, a covering material is removed from an end of each optical fiber by a predetermined length to expose a cladding. In such a state, those two optical fibers are, connected to each other by fusion splicing. (See, e.g., Patent Literature 1.) FIG. 1 shows two optical fibers fused in such a manner. With the structure shown in FIG. 1, two optical fibers 510 and 610 are fused together within a space surrounded by a reinforcement member 500. A downstream end of a covering material 520 of the optical fiber 510 is removed over its whole circumference, and an upstream end of a covering material 620 of the optical fiber 610 is removed over its whole circumference. An exposed end of a cladding 530 of the optical fiber 510 and an exposed end of a cladding 630 of the optical fiber 610 are fused at a fusion splicing point 700.

At the fusion splicing point 700 between the optical fibers 510 and 610, light propagating through the core of the optical fiber 510 may leak out to the cladding 630 of the output optical fiber 610 due to microbend or axial misalignment caused at the fusion splicing point 700. When general optical fibers are fused together, significant problems do not occur because the power of light propagating through the core is not so high. In optics through which high-power light propagates, such as a fiber laser, however, high-power leakage light is produced in the cladding 630 of the output optical fiber 610 even if only slight misalignment is caused to the fusion splicing point 700.

If the covering material 620 of the output optical fiber 610 has a refractive index higher than a refractive index, of the cladding 630, the leakage light produced in the cladding 630 of the optical fiber 610 is introduced into the covering material 620 from the cladding 630 and absorbed therein.

With the structure shown in FIG. 1, however, the covering material 620 covers the whole circumference of the cladding 630. Therefore, the leakage light produced in the cladding 630 is locally emitted to the covering material 620 at the most upstream part 642 of the covering material 620 that covers the cladding 630. Accordingly, the leakage light is locally absorbed in the covering material 620 at the most upstream part 642. This absorption may cause generation of heat or a serious accident such as fire.

PRIOR ART LITERATURE

Patent Literature

Patent Literature 1: JP 2009-116076 A

SUMMARY OF THE INVENTION

Problem(s) to be Solved by the Invention

The present invention has been made in view of the above drawbacks of the prior art. It is, therefore, a first object of the present invention to provide a leakage light removal structure that can efficiently remove leakage light produced in an optical fiber without causing local heat generation or fire.

A second object of the present invention is to provide a fiber laser capable of emitting a high-quality laser beam with high reliability.

Means for Solving Problem(s)

According to a first aspect of the present invention, there is provided a leakage light removal structure that can efficiently remove leakage light produced in an optical fiber without causing local heat generation or fire. The leakage light removal structure is used to remove leakage light in an optical fiber having a core, a cladding covering the core and having a refractive index lower than the core, and a covering material covering the cladding having a refractive index higher than the cladding. The leakage light removal structure has a fiber housing that houses part of the optical fiber, a covering material extension portion covering part of a whole circumference of the cladding by extending part of the covering material along a longitudinal direction of the optical fiber within the fiber housing, and a cladding exposure portion in which a portion of the whole circumference of the cladding other than the covering material extension portion is exposed within the fiber housing. The cladding exposure portion is covered with a medium or a resin having a refractive index lower than the refractive index of the cladding.

With such a configuration, when leakage light produced in the cladding in the optical fiber reaches an interface between the cladding and the covering material extension portion, it enters the covering material extension portion because the refractive index of the covering material extension portion is equal to or higher than the refractive index of the cladding. Thus, the leakage light is emitted to the covering material extension portion. Accordingly, it is possible to prevent generation of heat or fire that would be caused by leakage light. Thus, the reliability of the emission optics can be improved.

Furthermore, the covering material extension portion extends only over part of the whole circumference of the cladding. Therefore, the amount of the leakage light emitted into the covering material at the most upstream part of the covering material extension portion can be reduced as compared to a conventional structure in which the whole circumference of the cladding is covered with the covering material. Accordingly, it is possible to suppress local heat generation caused by leakage light absorbed in the covering material and thus to improve the reliability of the leakage light removal structure.

According to a second aspect of the present invention, there is provided a fiber laser capable of emitting a high-quality laser beam with high reliability. The fiber laser has a signal light generator operable to generate signal light, a pump laser diode operable to generate pump light, and a clad pumping fiber. The clad pumping fiber has a core through which the signal light propagates, a cladding which covers the core and through which the pump light propagates, and a covering material covering the cladding and having a refractive index higher than a refractive index of the cladding. The fiber laser has an output optical fiber connected to the clad pumping fiber by fusion splicing and the aforementioned leakage light removal structure configured to remove leakage light produced in the cladding of the output optical fiber.

In order to suppress local heat generation more effectively, it is preferable to form the covering material extension portion with a range of angles equal to or less than 180° about an axis of the optical fiber in a cross-section perpendicular to the axis. The refractive index of the medium or the resin covering the cladding exposure portion should preferably be lower than the refractive index of the covering material. The fiber housing should preferably include a heat radiator plate having a good thermal radiation characteristic, which is disposed so as to face the cladding exposure portion.

Advantageous Effects of the Invention

According to a leakage light removal structure of the present invention, it is possible to efficiently remove leakage light and to suppress local heat generation due to emission of the leakage light to improve the reliability. Furthermore, according to a fiber laser of the present invention, there can be provided a fiber laser capable of emitting a high-quality laser beam with high reliability.

MODE(S) FOR CARRYING OUT THE INVENTION

Figure 1:
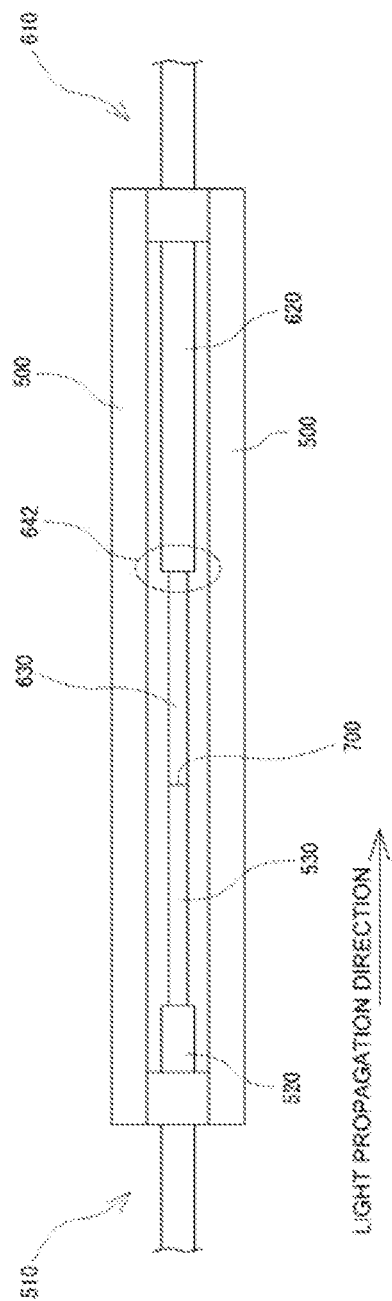
FIG. 1 is a diagram schematically showing a structure of a conventional fusion splicing portion of optical fibers.

Embodiments of a leakage light removal structure according to the present invention will be described in detail below with reference to FIGS. 2 to 8. In FIGS. 2 to 8, the same or corresponding components are denoted by the same or corresponding reference numerals and will not be described below repetitively.

Figure 2:
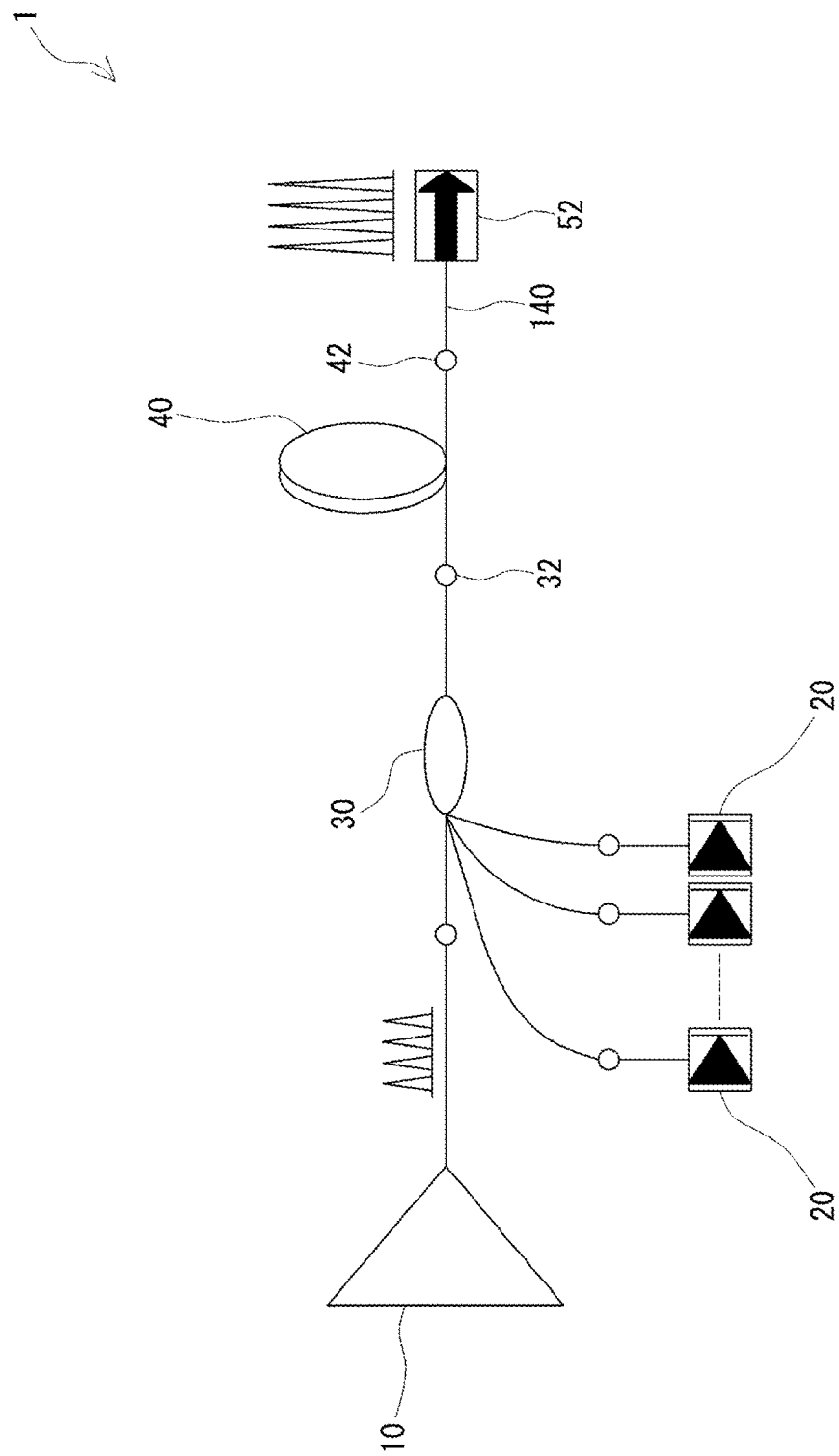
FIG. 2 is a schematic diagram showing a fiber laser according to a first embodiment of the present invention.

FIG. 2 is a schematic diagram showing a fiber laser 1 according to a first embodiment of the present invention. The fiber laser 1 has a signal light generator 10 operable to generate signal light, a plurality of pump laser diodes (LDs) 20 operable to generate pump light, an optical coupler 30 operable to couple the signal light from the signal light generator 10 and pump light from the pump LDs 20 and to output the coupled light, a clad pumping fiber 40 having an end connected to an output end 32 of the optical coupler 30, an output optical fiber 140 connected to an output end 42 of the clad pumping fiber 40, and an isolator 52 provided on the output optical fiber 140.

Figure 3:
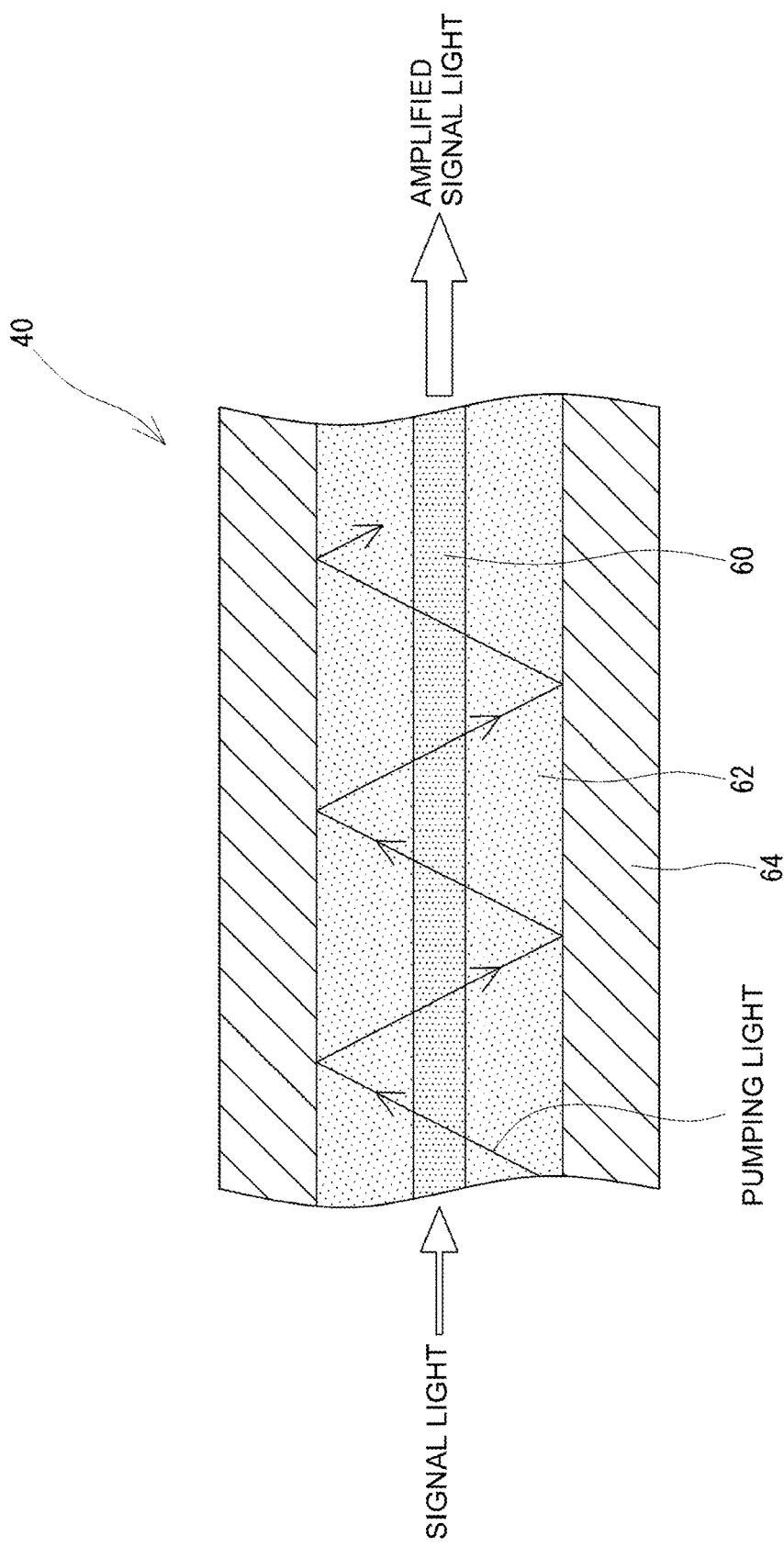
FIG. 3 is a cross-sectional view schematically showing a structure of a clad pumping fiber in the fiber laser illustrated in FIG. 2.

FIG. 3 is a cross-sectional view schematically showing the clad pumping fiber 40. As shown in FIG. 3, the clad pumping fiber 40 includes a core 60 for transmitting signal light generated by the signal light generator 10, a cladding (inner cladding) 62 covering the core 60, and a covering material (outer cladding) 64 covering the cladding 62. For example, the core 60 is formed of $SiO_2$ doped with a rare earth element such as Yb. The core 60 serves as a signal light waveguide for transmitting the signal light. The cladding 62 is formed of a material having a refractive index lower than a refractive index of the core 60 (e.g., $SiO_2$). The covering material 64 is formed of a resin having a refractive index lower than the refractive index of the cladding 62 (e.g., polymer with a low refractive index). Thus, the cladding 62 serves as a pump light waveguide for transmitting the pump light.

With a clad pumping fiber 40 thus constructed, signal light from the signal light generator 10 propagates within the core 60, and pump light from the pump LDs 20 propagates within the cladding 62 and the core 60. While the pump light propagates through the core 60, ions of the rare earth element doped in the core 60 absorbs the pump light to cause excitation. Thus, the signal light propagating through the core 60 is amplified by stimulated emission.

Figure 4:
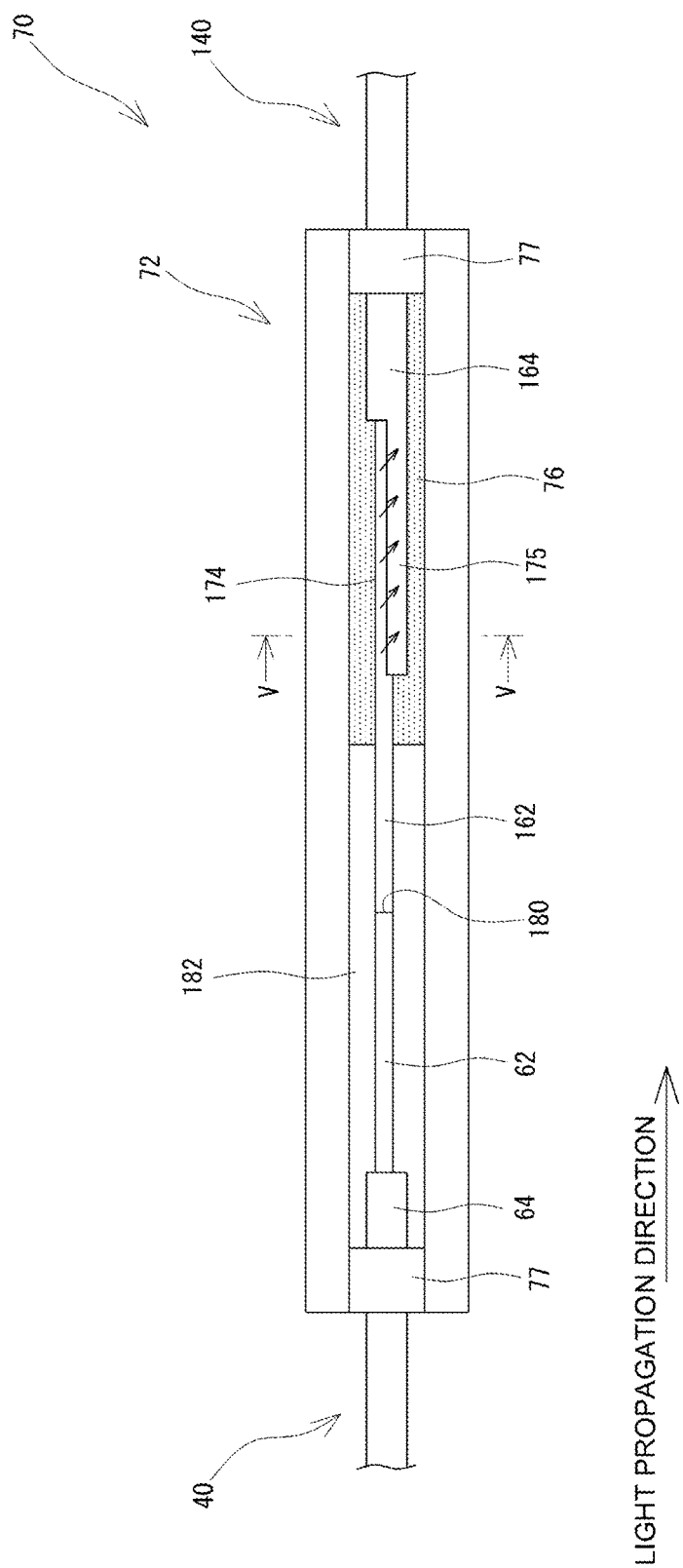
FIG. 4 is a diagram schematically showing a structure of a fusion splicing portion of optical fibers in the fiber laser illustrated in FIG. 2.
Figure 5:
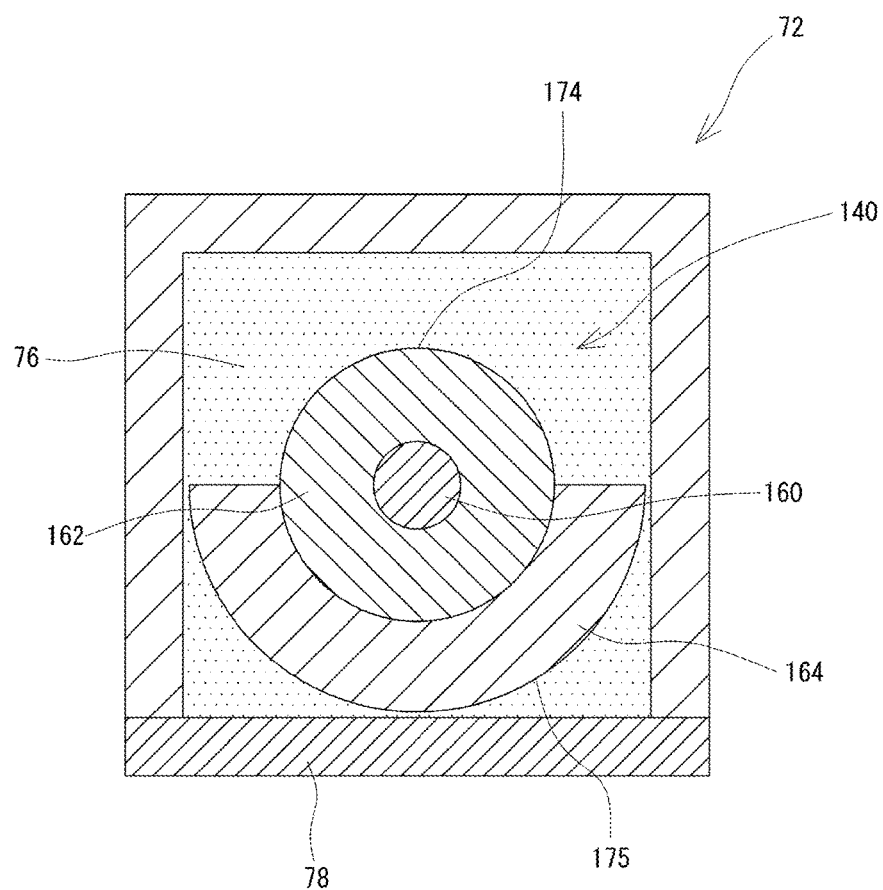
FIG. 5 is a cross-sectional view taken along line V-V of FIG. 4.

FIG. 4 is a diagram schematically showing a structure of a fusion splicing portion between optical fibers according to a first embodiment of the present invention, and FIG. 5 is a cross-sectional view taken along line V-V of FIG. 4. As shown in FIGS. 4 and 5, the clad pumping fiber 40 and the output optical fiber 140, which is located downstream of the clad pumping fiber 40, are connected to each other by fusion splicing within a fiber housing 72 that is substantially in the form of a rectangular parallelepiped. Specifically, a downstream end of the covering material 64 is removed over the whole circumference of the clad pumping fiber 40, and an upstream end of the covering material 164 is removed over the whole circumference of the output optical fiber 140. Thus, the exposed end of the cladding 62 of the clad pumping fiber 40 and the exposed end of the cladding 162 of the output optical fiber 140 are connected to each other at a fusion splicing point 180 by fusion splicing. In the present embodiment, the covering material 164 of the output optical fiber 140 has a refractive index higher than a refractive index of the cladding 162. The reference numeral 160 in FIG. 5 denotes a core of the output optical fiber 140.

At the fusion splicing point 180, light propagating through a core of the clad pumping fiber 40 may leak out to the cladding 162 of the output optical fiber 140 due to microbend or axial misalignment caused at the fusion splicing point 180. In the present embodiment, a leakage light removal structure 70 is provided for removing such leakage light.

Specifically, on a downstream side of the fusion splicing point 180 within the fiber housing 72, a portion of the covering material 164 is removed over a part of the whole circumference of the output optical fiber 140, for example, within a range of angles equal to or more than 180° (e.g., 180°) about an axis of the output optical fiber 140 in a cross-section perpendicular to that axis (FIG. 5). Therefore, the covering material 164 is exposed from the cladding 162 within this range so as to form a cladding exposure portion 174. In other words, a covering material extension portion 175 is formed by extending a portion of the covering material 164 along a longitudinal direction of the output optical fiber 140 within a range of angles equal to, or less than 180° about the axis of the output optical fiber 140. As shown in FIG. 4, this covering material extension portion 175 extends along the longitudinal direction of the output optical fiber 140 by a predetermined length.

Furthermore, an interior of the fiber housing 72 is filled with a resin (e.g., UV curable resin) 76 having a refractive index that is lower than the refractive index of the cladding 162 of the output optical fiber 140 and the refractive index of the covering material 164 at a wavelength being used. The cladding exposure portion 174 and the covering material extension portion 175 are covered with this resin 76. The reference numeral 77 in FIG. 4 denotes a hard resin material, which seals the interior of the fiber housing 72.

With such a configuration, when light propagating through a core of the clad pumping fiber 40 leaks out to the cladding 162 of the output optical fiber 140 due to a minute bend or an axial misalignment caused at the fusion splicing point 180, the leakage light propagates through the cladding 162 because the cladding 162 is covered with the resin 76 having a refractive index that is equal to or lower than the refractive indexes of the air cladding 182 and the cladding 162. When the leakage light that has propagated through the cladding 162 reaches an interface between the cladding 162 and the covering material extension portion 175, it enters the covering material extension portion 175 because the refractive index of the covering material extension portion 175 is equal to or higher than the refractive index of the cladding 162. Thus, the leakage light is emitted to the covering material extension portion 175. Accordingly, it is possible to prevent generation of heat or fire that would be caused on a downstream side of the leakage light removal structure 70 by leakage light. Thus, the reliability of the emission optics can be improved.

In the present embodiment, only part of the whole circumference of the cladding 162 is covered with the covering material extension portion 175. Therefore, the amount of the leakage light emitted into the covering material 164 at the most upstream part of the covering material extension portion 175 can be reduced as compared to the conventional structure shown in FIG. 1 in which the whole circumference of the cladding is covered with the covering material. Accordingly, it is possible to suppress local heat generation caused by leakage light absorbed in the covering material 164 and thus to improve the reliability of the leakage light removal structure 70. At that time, the covering material extension portion 175 may cover part of the whole circumference of the cladding 162. In order to suppress local heat generation more effectively, it is preferable to form a covering material extension portion 175 with an angle that is equal to or less than 180° about the axis of the output optical fiber 140 in a cross-section (FIG. 5) perpendicular to that axis.

In the present embodiment, the resin 76 covering the covering material 164 has a refractive index lower than that of the covering material 164. Therefore, leakage light emitted into the covering material 164 is confined in the covering material 164 and absorbed in the covering material 164 while it propagates through the covering material 164. However, since part of the whole circumference of the cladding 162 is covered with the material extension portion 175 as described above, the amount of leakage light per unit length can be reduced as compared to the conventional structure. Thus, the total amount of generated heat can be reduced.

As shown in FIG. 5, a portion of the fiber housing 72 is formed by a heat radiator plate 78 having good thermal radiation characteristics. The heat radiator plate 78 is disposed so as to face the covering material extension portion 175. When such a heat radiator plate 78 having good thermal radiation characteristics is disposed so as to face the covering material extension portion 175, heat generated in the covering material 164 by the leakage light emitted into the covering material 164 can effectively be radiated through the heat radiator plate 78. Examples of such a heat radiator plate 78 include metal plates having a surface anodized with aluminum or aluminum alloy.

Figure 6:
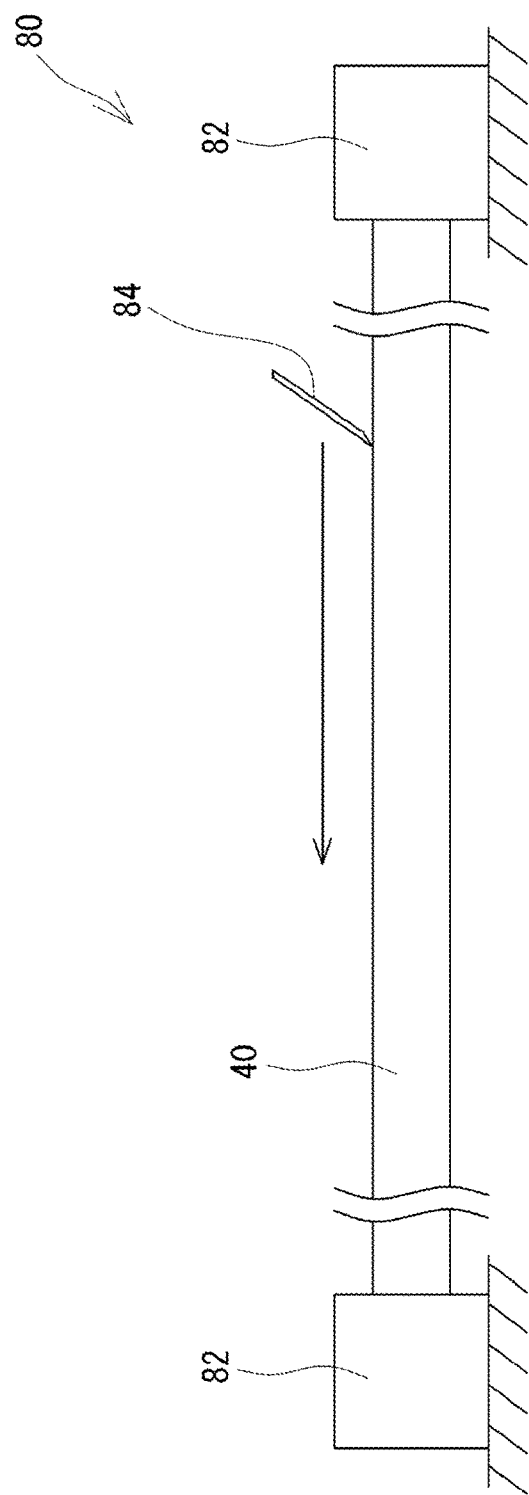
FIG. 6 is a schematic diagram showing an apparatus for forming a cladding exposure portion in a clad pumping fiber illustrated in FIG. 4.

For example, the aforementioned covering material extension portion 175 can be formed with use of an apparatus 80 as shown in FIG. 6. The apparatus 80 has holders 82 for holding opposite ends of the output optical fiber 140 and a blade 84 in the form of a plane for shaving a surface of the output optical fiber 140.

When the covering material extension portion 175 is formed with use of this apparatus 80, the output optical fiber 140 is first held by the holders 82. In that state, the blade 84 is brought into contact with the surface of the output optical fiber 140 and moved in a longitudinal direction of the output optical fiber 140 by a certain distance. Thus, the covering material 164 present on the surface of the output optical fiber 140 is peeled by the certain distance so as to expose the cladding 162 from the covering material 164.

Then the output optical fiber 140 held by the holders 82 is rotated through 20° about its axis, and the blade 84 is moved back to the original position. Thereafter, the blade 84 is brought into contact with the surface of the output optical fiber 140 again and moved in the longitudinal direction of the output optical fiber 140 by the same distance as moved previously. Thus, the covering material 164 is similarly peeled by the certain distance so as to expose the cladding 162 from the covering material 164. For example, the above operation is repeated nine times in total to expose the cladding 162 from the covering material 164 with a range of 180° about the axis of the output optical fiber 140 in the cross-section perpendicular to that axis (FIG. 5). Thus, the aforementioned covering material extension portion 175 is formed. In this manner, the size of the covering material extension portion 175 can be controlled by the number of shaving processes with the blade 84 and a rotation angle of the clad pumping fiber 40.

The present embodiment describes an example in which the cladding exposure portion 174 and the covering material extension portion 175 are covered with the resin 76. The cladding exposure portion 174 and the covering material extension portion 175 may not be covered with the resin 76. The cladding exposure portion 174 and the covering material extension portion 175 may be covered with a medium (air or the like) that has a refractive index lower than the refractive index of the cladding 162 (and the refractive index of the covering material 164). In order to prevent the covering material extension portion 175 from being peeled from the surface of the cladding 162 and to promote absorption of heat from leakage light absorbed in the covering material extension portion 175, it is preferable to cover the cladding exposure portion 174 and the covering material extension portion 175 with the resin 76 as in the present embodiment. Furthermore, this resin 76 may be filled into the air cladding 182 within the fiber housing 72.

Example 1

First, a conventional leakage light removal structure shown in FIG. 1 was produced as a comparison example. The optical fibers 510 and 610 included a core having a diameter of 10 μm and a cladding 530 or 630 having a diameter of 400 μm. An end of each of the covering materials 520 and 620 of the optical fibers 510 and 610 was removed along its axial direction by 20 mm so as to expose the claddings 530 and 630. Ultrasonic cleaning with ethanol was conducted to clean surfaces of the exposed claddings 530 and 630.

Within a reinforcement member 500 formed of a ceramic member having a coefficient of linear expansion that was adjusted to that of quartz glass, the claddings 530 and 630 of the optical fibers 510 and 610 were jointed and fused to each other. Opposite ends of the reinforcement member 500 and the optical fibers 510 and 610 were fixed with a hard UV curable resin.

In that state, the fiber laser was operated at an output of 600 W. The most upstream part 642 of the covering material 620 was locally heated as expected and increased in temperature to about 90° C. Depending upon the heat resistance of the covering material 620, the covering material 620 suffers from heat deterioration when the temperature of the covering material 620 increases during a production process. Then the amount of absorption of light increases, which causes an increased temperature of the covering material 620. Thus, negative feedback is generated. According to calculation from experiments, the lifetime of the covering material 620 used at that time was about 20,000 hours. It was found that the covering material 620 had a very short lifetime.

A light removal structure 70 as shown in FIG. 4 was produced in the same manner. A resin (polymer cladding) having a refractive index of 1.37 was used for the covering material 164 of the output optical fiber 140, and a UV curable resin having a refractive index of 1.32 was used for the resin 76. The same components as used in the aforementioned conventional leakage light removal structure were used for components other than the aforementioned components.

The covering material extension portion 175 was produced with use of the apparatus shown in FIG. 8. Specifically, the blade 84 was brought into contact with a surface of the output optical fiber 140 held by the holders 82 and moved in a longitudinal direction of the output optical fiber 140 by 30 mm to expose the cladding 162 from the covering material 164. Then the output optical fiber 140 was rotated through 20° about its axis. This cutting process was performed nine times to expose the cladding 162 with an angle of 180° in total.

The fiber laser was operated under the same conditions as the test for the conventional leakage light removal structure. The greatest temperature increase of the covering material extension portion 175 was as low as 55° C. Thus, it was found that local temperature increase was reduced. When the lifetime of the covering material 164 was calculated based on this result of the temperature increase, it would be 90,000 hours or more. Thus, it is found that the lifetime can overwhelmingly be extended as compared to the conventional leakage light removal structure.

Although some preferred embodiments of the present invention have been described, the present invention is not limited to the aforementioned embodiments. It should be understood that various different forms may be applied to the present invention within the technical idea thereof.

INDUSTRIAL APPLICABILITY

The present invention is suitable for use in a leakage light removal structure for removing leakage light produced at a fusion splicing point of optical fibers or the like in a fiber laser.

DESCRIPTION OF REFERENCE NUMERALS AND SIGNS

1 fiber laser
10 signal light generator
20 pumping LD
30 optical coupler
32 output end
40 clad pumping fiber
42 output end
52 isolator
60 core
62 cladding
64 covering material
70 light removal structure
72 fiber housing
74 cladding exposure portion
78 heat radiator plate
140 output optical fiber
160 core
162 cladding
164 covering material
174 cladding exposure portion
175 covering material extension portion
180 fusion splicing point
182 air cladding

The invention claimed is:

1. A leakage light removal structure for removing leakage light in an optical fiber having a core, a cladding covering the core and having a refractive index lower than a refractive index of the core, and a covering material covering the cladding and having a refractive index higher than the refractive index of the cladding, the leakage light removal structure comprising:
   a fiber housing that houses part of the optical fiber;
   a covering material base portion formed by part of the covering material that covers a whole circumference of the cladding;
   a covering material extension portion covering part of the whole circumference of the cladding by extending part of the covering material from the covering material base portion along a longitudinal direction of the optical fiber within the fiber housing, the covering material extension portion extending continuously upstream from the covering material base portion along the longitudinal direction of the optical fiber; and
   a cladding exposure portion in which a portion of the whole circumference of the cladding other than the covering material extension portion is exposed within the fiber housing, the cladding exposure portion being covered with a medium or a resin having a refractive index lower than the refractive index of the cladding such that the leakage light emitted into the covering material is confined in the covering material by the medium or the resin and absorbed in the covering material while propagating through the covering material.

2. The leakage light removal structure as recited in claim 1, wherein the covering material is a material covering and contacting surface of the cladding and the covering material extension portion is formed with a range of angles equal to or less than 180° about an axis of the optical fiber in a cross-section perpendicular to the axis.

3. The leakage light removal structure as recited in claim 2, wherein the fiber housing includes a heat radiator plate disposed so as to face the cladding exposure portion, the heat radiator plate having a good thermal radiation characteristic.

4. The leakage light removal structure as recited in claim 1, wherein the fiber housing includes a heat radiator plate disposed so as to face the cladding exposure portion, the heat radiator plate having a good thermal radiation characteristic.

5. The leakage light removal structure as recited in claim 1, wherein the fiber housing includes a heat radiator plate disposed so as to face the cladding exposure portion, the heat radiator plate having a good thermal radiation characteristic.

6. A fiber laser comprising:
a signal light generator operable to generate signal light;
a pump laser diode operable to generate pump light;
a clad pumping fiber having a core through which the signal light propagates, a cladding covering the core, and a covering material covering the cladding and having a refractive index higher than a refractive index of the cladding, the pump light propagating through the cladding;
an output optical fiber connected to the clad pumping fiber by fusion splicing; and
the leakage light removal structure as recited in claim 1, the leakage light removal structure being configured to remove leakage light produced in the cladding of the output optical fiber.

7. The fiber laser as recited in claim 6, wherein the covering material is a material covering and contacting surface of the cladding and the covering material extension portion is formed with a range of angles equal to or less than 180° about an axis of the optical fiber in a cross-section perpendicular to the axis.

8. The fiber laser as recited in claim 7, wherein the fiber housing includes a heat radiator plate disposed so as to face the cladding exposure portion, the heat radiator plate having a good thermal radiation characteristic.

9. The fiber laser as recited in claim 6, wherein the fiber housing includes a heat radiator plate disposed so as to face the cladding exposure portion, the heat radiator plate having a good thermal radiation characteristic.

10. The fiber laser as recited in claim 6, wherein the covering material extension portion is located on an upstream side of the covering material base portion.

11. The leakage light removal structure as recited in claim 1, wherein the covering material extension portion is located on an upstream side of the covering material base portion.

12. The leakage light removal structure as recited in claim 1, wherein the cladding exposure portion is covered with the resin and the resin surrounds exposed surface of a projecting part of the cladding, the projecting part projecting from the cladding exposure portion in the longitudinal direction of the optical fiber.

13. The leakage light removal structure as recited in claim 12, wherein the covering material extension portion is covered with the resin.

14. The leakage light removal structure as recited in claim 1, wherein the covering material extension portion is covered with the medium or the resin.

* * * * *